June 19, 1934.    E. GALBANI    1,963,697

CASING BOX FOR CHEESE TO BE CUT

Filed Aug. 15, 1932

INVENTOR:
E. Galbani
By: Marks & Clark Attys

Patented June 19, 1934

1,963,697

UNITED STATES PATENT OFFICE 1,963,697

CASING BOX FOR CHEESE TO BE CUT

Egidio Galbani, Milan, Italy

Application August 15, 1932, Serial No. 628,901
In Italy January 11, 1932

2 Claims. (Cl. 217—5)

This invention relates to a casing box for cheese to be cut and has for it object the production of a box which, when shut, protects the cheese against deletereous external influences, but, when it is open, serves as a basis for guiding and regulating the cheese cutting.

Said box is also particularly adapted for all kinds of weak cheeses, these last remaining within the box well protected and in their regular form.

According to the invention, said box, comprises an under body designed to contain the cheese and an upper cover, and is characterized by the feature that said under body is deprived of a vertical front wall and in correspondence to the thus resulting opening has its bottom prolonged to a certain extent with respect to the two vertical side walls, whilst the cover is composed in such a manner as to result as the complement necessary for forming together with the under body a completely shut casing. In other words, said cover, besides constituting an upper horizontal wall to be adapted upon the vertical walls of the under body carries a front vertical wall with two small adjacent vertical walls designed to lean upon the border of the projecting portion of the bottom of the same under body.

The regulation of the cheese cutting, when the box is open, is obtained by causing the cheese to advance upon the projecting bottom and guiding the knife upon the edges of the two vertical side walls.

The box adapted to be employed for cheeses of various kinds, particularly those having the form of a parallelopiped, results on account of its great simplicity specially advantageous not only in the shops for selling the cheese by retail, but also in the field of the domestic economy, in general.

The desired form of a casing box for cheese to be cut, is illustrated, in the accompanying drawing in which Fig. 1 is a longitudinal view of the shut box;

Figure 1:
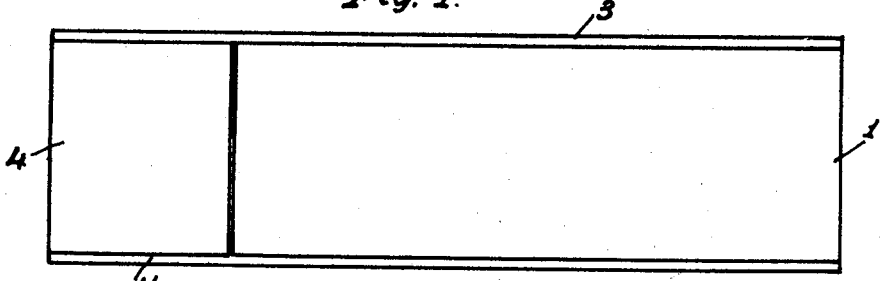
Figure 2:
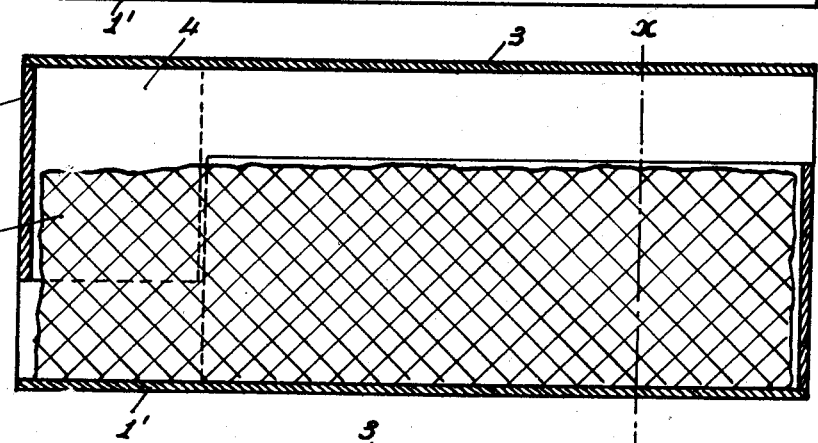
Figs. 2 and 3 are respectively a longitudinal section and a cross section of the box with the cover raised.
Figure 3:
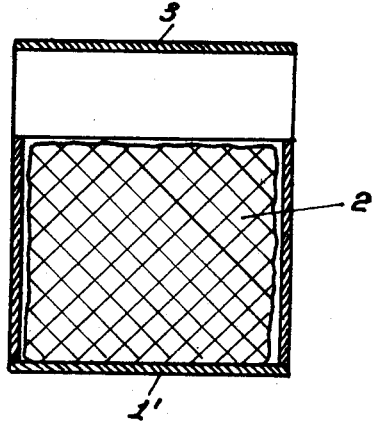
Figure 4:
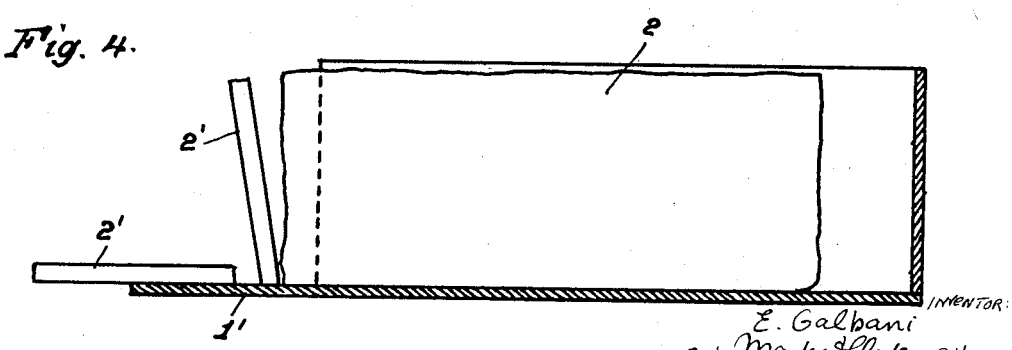
Fig. 4 is a longitudinal section of the box without the cover and containing the cheese advanced to a position where it may be cut.

According to the drawing, the under body 1 is adapted to contain the cheese and forms the principal portion of the box. It is deprived of the front wall and has at the front its bottom prolonged with respect to the vertical side walls in such a manner, as to form a platform 1' upon which the cutting of the slices 2' from the cheese 2 is effected. To locate the cheese for cutting, the cheese is advanced a desired distance and the knife is pushed down and guided by the edges of the vertical side walls of the body 1.

The cover comprises a wall 3, designed to form the top of the box, two small side walls 4 having a length corresponding to the length of the sides of the platform 1' and a front wall 5. When the box is shut by the cover, the two walls 4 of the cover extend downwardly upon the sides of the platform 1' whilst the wall 4 bears upon the front portion of the platform. In these conditions, the whole of the cheese and its cover takes the form of a regular parallelopiped.

The box may be made of wood or any other suitable material.

It is to be understood that the particulars of form and construction of the box may vary from those represented and described without departing from the spirit of the invention.

Having now particularly described the nature of my invention what I claim is:

1. A casing box for cheese to be cut comprising a body part and a complementary cover adapted to fit onto the body part; said body part including a bottom and side walls with the bottom projecting beyond the side walls to provide a cutting platform at the front end of the box; said cover including a top and restricted side walls adapted to fit the recesses above the platform and at the front ends of the side walls of the body part of the box, and said cover having at its front end a vertical wall closing the space between the front edges of the restricted side walls of the cover.

2. A casing box as claimed in claim 1, characterized by the feature that the projecting platform at the front end of the bottom of the body part of the box provides a cutting support for the cheese, and the front ends of the side walls of the body part provides guides for the cutting implement with relation to the cheese on the platform.

EGIDIO GALBANI.